(12) United States Patent
Zhu et al.

(10) Patent No.: US 11,055,516 B2
(45) Date of Patent: Jul. 6, 2021

(54) BEHAVIOR PREDICTION METHOD, BEHAVIOR PREDICTION SYSTEM, AND NON-TRANSITORY RECORDING MEDIUM

(71) Applicant: BEIJING KUANGSHI TECHNOLOGY CO., LTD., Beijing (CN)

(72) Inventors: Yanjun Zhu, Beijing (CN); Gang Yu, Beijing (CN)

(73) Assignee: BEIJING KUANGSHI TECHNOLOGY CO., LTD., Beijing (CN)

( * ) Notice: Subject to any disclaimer, the term of this patent is extended or adjusted under 35 U.S.C. 154(b) by 219 days.

(21) Appl. No.: 16/175,320

(22) Filed: Oct. 30, 2018

(65) Prior Publication Data
US 2019/0205629 A1    Jul. 4, 2019

(30) Foreign Application Priority Data
Jan. 4, 2018    (CN) .......................... 201810008835.X

(51) Int. Cl.
*G06K 9/00* (2006.01)
*G06T 7/246* (2017.01)
*G06F 16/51* (2019.01)

(52) U.S. Cl.
CPC ......... *G06K 9/00335* (2013.01); *G06F 16/51* (2019.01); *G06K 9/00718* (2013.01);
(Continued)

(58) Field of Classification Search
CPC ........... G06K 9/00335; G06K 9/00724; G06K 9/00744; G06K 9/00718; G06F 17/3028;
(Continued)

(56) References Cited

U.S. PATENT DOCUMENTS

2007/0074266 A1\* 3/2007 Raveendran ........... H04N 19/36
                                                                  725/135
2008/0031741 A1    2/2008 Torres
(Continued)

FOREIGN PATENT DOCUMENTS

CN        104239852        12/2014
CN        104463174         3/2015
(Continued)

OTHER PUBLICATIONS

First Chinese Office Action, issued in the corresponding Chinese patent application No. 201810008835.X, dated Apr. 26, 2020, 21 pages.

*Primary Examiner* — Syed Haider
(74) *Attorney, Agent, or Firm* — Hamre, Schumann, Mueller & Larson, P.C.

(57) ABSTRACT

There are provided in the present disclosure a behavior prediction method, an apparatus, a system and a non-transitory recording medium. The behavior prediction method includes: obtaining a part of behavior action video frame sequence, which only reflects a part of behavior actions but does not reflect all of the behavior actions; selecting a key information frame from the part of behavior action video frame sequence, wherein the key information frame has a significant differentiation in the part of behavior action video frame sequence; and predicting a type of the behavior action based on the key information frame.

12 Claims, 6 Drawing Sheets

(52) U.S. Cl.
CPC ..... *G06K 9/00724* (2013.01); *G06K 9/00744* (2013.01); *G06T 7/248* (2017.01); *G06T 2207/20084* (2013.01); *G06T 2207/30196* (2013.01); *G06T 2207/30221* (2013.01)

(58) Field of Classification Search
CPC ................... G06F 16/51; G06T 7/248; G06T 2207/30196; G06T 2207/30221; G06T 2207/20084
See application file for complete search history.

(56) References Cited

U.S. PATENT DOCUMENTS

| | | | |
|---|---|---|---|
| 2009/0210090 A1* | 8/2009 | Takemitsu | B25J 9/1661 700/245 |
| 2010/0329574 A1* | 12/2010 | Moraleda | G06F 16/7328 382/217 |
| 2014/0029666 A1* | 1/2014 | Sakomizu | H04N 19/50 375/240.12 |
| 2016/0092727 A1* | 3/2016 | Ren | G06T 7/194 382/103 |
| 2018/0260665 A1* | 9/2018 | Zhang | G06K 9/6215 |
| 2019/0095745 A1* | 3/2019 | Bao | G06K 9/00664 |

FOREIGN PATENT DOCUMENTS

| | | | |
|---|---|---|---|
| CN | 104463174 A | * | 3/2015 |
| CN | 106407889 | | 2/2017 |
| CN | 106407889 A | * | 2/2017 |
| CN | 107292247 | | 10/2017 |

* cited by examiner

BEHAVIOR PREDICTION METHOD, BEHAVIOR PREDICTION SYSTEM, AND NON-TRANSITORY RECORDING MEDIUM

CROSS-REFERENCE TO RELATED APPLICATION

The present application claims the priority of Chinese patent application No. 201810008835.X filed on Jan. 4, 2018, the disclosure of which is incorporated herein by reference in its entirety.

TECHNICAL FIELD

The present disclosure relates to a technical field of image and video recognition, in particular to a behavior prediction method, a behavior prediction system and a non-transitory recording medium.

BACKGROUND

Human behavior recognition has tremendous application value in video monitoring and video indexing. An increasing number of algorithms are proposed to recognize specific behaviors. However, these methods can only be used to recognize behaviors and actions which have been already occurred in complete, that is, only when a certain behavior action occurs in complete, an accurate judgment can be given.

As for a qualified behavior recognition intelligent system, it needs to have a capability of taking preventive measures, i.e., recognizing it accurately before a behavior occurs in complete, so as to avoid unnecessary loss. By taking an autonomous vehicles as an example, it appears to be particularly important to predict a traffic accident accurately and take corresponding measures in time.

At present, algorithms performing behavior predictions in videos either use all observed frames, or randomly select a part of frames to represent videos. Prediction accuracy of these algorithms is not high, and the prediction accuracy is low particularly when an action just happened (for example, the former 10% of the complete behavior action range).

SUMMARY

There is provided a solution relating to a behavior prediction, which aims at solving a problem of behavior prediction when only a part of videos is observed. This solution selects key information frame in a part of observed video frames to represent this video, and thus for a scenario where an observed video has a low occupation in the entire behavior action, it can enhance the accuracy of its behavior prediction greatly. The solution relating to the behavior prediction proposed in the present disclosure will be described briefly, and more details will be described in the specific implementations below by combining with the accompanying figures.

According to one aspect of the present disclosure, there is provided a behavior prediction method, comprising: obtaining a part of behavior action video frame sequence, which only reflects a part of behavior actions but does not reflect all of the behavior actions; selecting a key information frame from the part of behavior action video frame sequence, wherein the key information frame has a significant differentiation in the part of behavior action video frame sequence; and predicting a type of the behavior action based on the key information frame.

According to another aspect of the present disclosure, there is provided a behavior prediction apparatus, comprising: an obtaining module, configured to obtain a part of behavior action video frame sequence, which only reflects a part of behavior actions but does not reflect all of the behavior actions; a selecting module, configured to select a key information frame from the part of behavior action video frame sequence, wherein the key information frame has a significant differentiation in the part of behavior action video frame sequence; and a predicting module, configured to predict a type of the behavior action based on the key information frame.

According to another aspect of the present disclosure, there is provided a behavior prediction system comprising a storage device and a processor, wherein a computer program executed by a processor is stored on the storage device, and the computer program performs the behavior prediction method as described above when being executed by the processor.

According to another aspect of the present disclosure, there is provided a non-transitory recording medium upon which computer program instructions are stored, wherein the behavior prediction method is performed as described above when the computer program instructions being executed.

The behavior prediction method, apparatus, system and storage medium according to the embodiments of the present disclosure can predict the type of the behavior action by extracting the key information frame when only a part of videos of the behavior actions is observed, which greatly enhances the accuracy in prediction of the behavior action when the observed video has a very low occupation in the entire behavior action.

BRIEF DESCRIPTION OF THE DRAWINGS

The above and other purposes, features and advantages of the present disclosure will become more evident by combining with the accompanying figures to describe embodiments of the present disclosure in detail. The figures are used to provide further understanding of the embodiments of the present disclosure, and form a part of the specification. The figures and the embodiments of the present disclosure are used together to explain the present disclosure, but do not form a limitation to the present disclosure. In the figures, same reference marks generally represent same means or steps.

DETAILED DESCRIPTION

In order to make purposes, technical solutions and advantages of the present disclosure more evident, exemplary embodiments according to the present disclosure will be described in detail by referring to the accompanying figures. Obviously, the embodiments described below are just a part of embodiments of the present disclosure, but not all the embodiments of the present disclosure, and it shall be understood that the present disclosure is not limited to the exemplary embodiments described herein. Based on the embodiments of the present disclosure described in the present disclosure, all the other embodiments obtained by those skilled in the art without paying any inventive labor shall fall into the protection scope of the present disclosure.

First, an exemplary electronic device 100 used for realizing a behavior prediction method, apparatus, system and storage medium according to an embodiment of the present disclosure will be described by referring to FIG. 1

Figure 1:
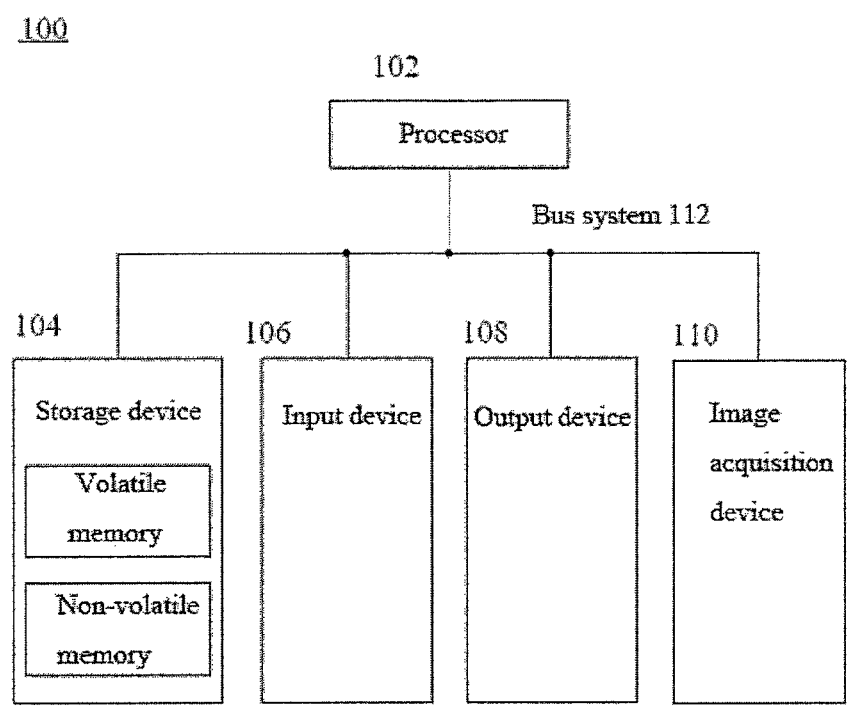
FIG. 1 shows a schematic block diagram of an exemplary electronic device used to implement a behavior prediction method, an apparatus, a system and a storage medium according to an embodiment of the present disclosure.

As shown in FIG. 1, the electronic device 100 comprises one or more processors 102, one or more storage devices 104, an input device 106, an output device 108 and an image acquisition device 110. These components are connected to each other via a bus system 112 and/or a connection mechanism (not shown) in other forms. It shall be noted that components and structures of the electronic device 100 as shown in FIG. 1 are just for illustration but not for limitation. According to the requirements, the electronic device may have other components and structures.

The processor 102 can be a central processing unit (CPU) or other forms of processing units having data processing capability and/or instruction executing capability, and can control other components in the electronic device 100 to execute desired functions.

The storage device 104 can comprise one or more computer program products, which can comprise various forms of computer readable storage medium, such as a volatile memory and/or a non-volatile memory. The volatile memory can comprise for example a random access memory (RAM) and/or a cache memory, etc. The non-volatile memory can comprise for example a read-only memory (ROM), a hardware, a flash memory, etc. One or more computer program instructions can be stored upon the computer readable storage medium, and the processor 102 can execute the program instructions, to realize functions of a client and/or other desired functions (realized by the processor) in the embodiment of the present disclosure described below. Various application programs and various data can be stored in the computer readable medium, for example various data used and/or produced by the application programs and so on and so forth.

The input device 106 can be a device used by a user to input instructions, and can comprise one or more of a keyboard, a cursor mouse, a microphone and a touch screen or the like.

The output device 108 can output various information (for example, image or sound) to the outside (for example, a user), and can comprise one or more of a display, a speaker, or the like.

The image acquisition device 110 can acquire an image (for example, a picture, a video, etc.) desired by the user, and store the acquired image in the storage device 104 so as to be used by other components. The image acquisition device 110 can be a camera. It shall be understood that the image acquisition device 110 is just an example, and the electronic device 100 may not comprise the image acquisition device 110. In this scenario, images to be processed can be acquired by utilizing a means having the capability of image acquisition, and transmit the acquired image to be processed to the electronic device 100.

Exemplarily, the exemplary electronic device used for realizing the behavior prediction method and apparatus according to the embodiment of the present disclosure can be realized as a mobile terminal such as an intelligent phone, a tablet computer, etc.

Figure 2:
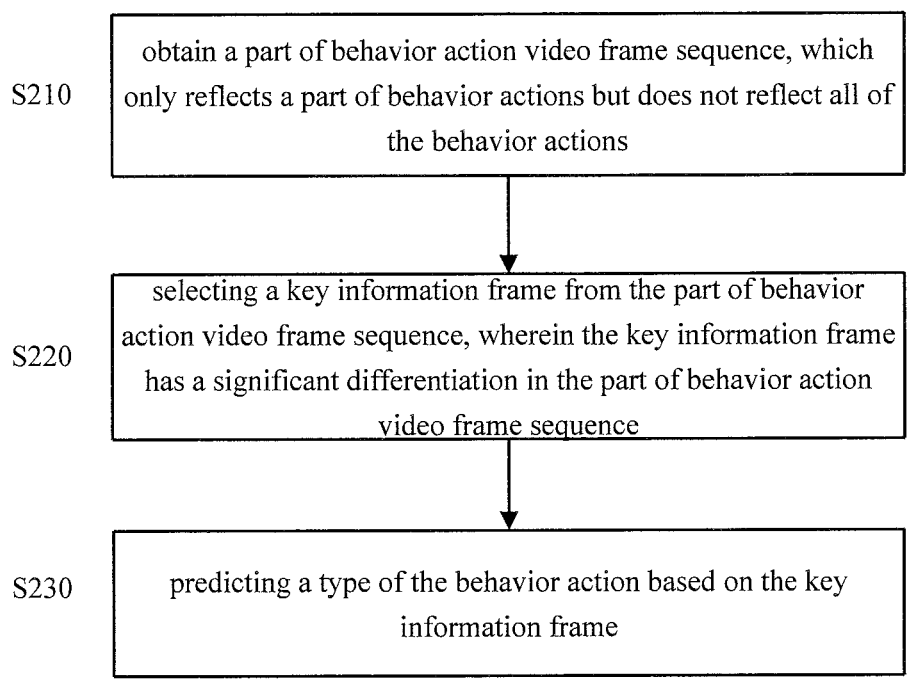
FIG. 2 shows a schematic flow diagram of a behavior prediction method according to an embodiment of the present disclosure.

A behavior prediction method 200 according to an embodiment of the present disclosure will be described by referring to FIG. 2. As shown in FIG. 2, the behavior prediction method 200 can comprise following steps:

In step S210, obtain a part of behavior action video frame sequence, which only reflects a part of behavior actions but does not reflect all of the behavior actions;

A complete behavior action would persist for some time from the start of occurrence to the end. A traditional behavior recognition method needs to analyze all the frames within the duration of the entire action. In this way, the algorithm would have a delay, and thus it is hard to be applied in a scenario which requires stronger real-time capability. In the behavior prediction solution in the embodiment of the present disclosure, it is unnecessary to wait for the end of the entire behavior, and prediction of the behavior action can be realized when the part of behavior action video frame sequence is obtained. For example, the part of behavior action video frame sequence can be a part of video at the very beginning of the behavior action. For another example, the part of behavior action video frame sequence can be first 10%, first 15% and so on of all the frames included the entire behavior action. On the whole, the part of behavior action video frame sequence obtained in step S210 reflects only a part of behavior actions but does not reflect all the behavior actions. In one example, the part of behavior action video frame sequence can be a video frame observed currently in real time. In another example, the part of behavior action video frame sequence can be a video frame from any source.

In step S220, selecting a key information frame from the part of behavior action video frame sequence, wherein the key information frame has a significant differentiation in the part of behavior action video frame sequence.

In the embodiment of the present disclosure, the key information frame selected from the video frames obtained in step S210 is an information frame being capable of representing this segment of video, and it has significant differentiation in the obtained video framed compared with other frames, so that recognition and prediction of behavior actions in this segment of video can be implemented based on this key information frame. In one example, the selected key information frame can comprise a key information image, i.e., key information of a spatial domain. The information of the spatial domain can reflect appearance characteristics, focused targets and scenarios of behaviors. In another example, the selected key information frame can comprise key information optical flow, i.e., key information of a time domain. The information of the time domain can be reflected as behavior action characteristics, to capture differences of actions. In another example, the selected key information frame can comprise both the key information image and the key information optical flow, i.e., selecting the key information of the spatial domain and the time domain simultaneously, so that the subsequent behavior prediction would become more accurate.

On one embodiment, selecting of the key information image can comprise: calculating a classification score value of each frame in the part of behavior action video frame sequence, the classification score value being a value of a type having a highest score value in a classification score vector of the each frame or being a variance between score values of respective types in the classification score vector of the each frame; and sorting an order of the part of behavior action video frame sequence according to the classification score value from high to low, and taking first m frame images obtained by sorting an order as the key information image, where m is a natural number.

Exemplarily, selecting of the key information image can be implemented based on a first neural network (for example, RGB histogram selection network). For example, the first neutral network can implement simple classified recognition on each frame of the video frames obtained in step S210, to output the classification score vector. Each element in the classification score vector is a score value of respective types which can be classified by the first neutral network. A type having a higher score value is likely to be a type of the behavior action in the frame. Herein, the type can comprise a type of the behavior action to be predicted.

In one example, for each frame, a value of a type having a highest score in the classification score vector output by the first neural network can be taken as a classification score value of the frame, then an order of video frames obtained in step S210 is sorted in an order of the classification score values from high to low, and the first m frame images are taken as the key information image. In another example, for each frame, the variance between score values of respective types in the classification score vector output by the first neural network can be taken as the classification score value of the frame. Then, the order of the video frames obtained in step S210 are sorted in an order of the classification score values from high to low. In those two examples, the higher the classification score value is, the more differentiation the information representing this frame has. Herein, the value of m can depend on the actual requirements. Exemplarily, the value of m can be 10% of the total number of video frames obtained in step S210.

In one embodiment, selecting of the key information optical flow comprises: calculating optical flows between all of consecutive two frames in the part of behavior action video frame sequence to form a plurality of stacked optical flows; calculating a classification score value of each stacked optical flow in the plurality of stacked optical flows, the classification score value being a value of a type having a highest score value in a classification score vector of each stacked optical flow or being a variance between score values of respective types in the classification score vector of each stacked optical flow; and sorting an order of the plurality of stacked optical flows according to the classification score value from high to low, and taking first n stacked optical flows obtained by sorting an order as the key information optical flow, where n is a natural number.

Exemplarily, selecting of the key information optical flow can be implemented based on a second neutral network (optical flow image selection network). For example, optical flow between per consecutive two frames of the video frames obtained in step S210 can be first calculated. Herein, optical flow can represent a playground between two consecutive frames, which can be decomposed into horizontal (x) and vertical (y) directions. The numerical values in the two directions can be reserved as two gray scales respectively, which can be taken as two channels of a picture, that is, optical flow between per consecutive two frames can be decomposed into horizontal and vertical directions as an optical flow image of two channels. Optical flow images of several consecutive frames are stacked together in a channel augmented manner as one stacked optical flows. For example, optical flow images of consecutive p frames are stacked together to than a stacked optical flow image of a 2p channel as one stacked optical flow. Optical flow images of a plurality of consecutive p frames are stacked together to form a plurality of stacked optical flows, where p is a natural number, for example, p may be equal to 0. A plurality of stacked optical flows can be constituted as an input of the second neutral network. Simple classified recognition is implemented on each stacked optical flow by the second neutral network, to output the classification score vector, and each element in the classification score vector is a score value of respective types which can be classified by the second neutral network. The type having a higher score value is likely to be a type of a behavior action in the stacked optical flow. Herein, the type can comprise the type of the behavior action to be predicted.

In one example, for each stated optical flow, a value of a type having the highest score value in the classification score vector output by the second neutral network can be taken as the classification score value of the stacked optical flow, then an order of the plurality of stacked optical flows are sorted in an order of the classification score value from high to low, and the first n stacked optical flows are taken as the key information optical flow. In another example, for each stacked optical flow, a variance between score values of respective types in the classification score vector output by the second neutral network output can be taken as the classification score value of the stacked optical flows, then an order of the plurality of stacked optical flows can be sorted in an order of the classification score value from high to low, and the first n stacked optical flows are taken as the key information optical flow. In these two example, the higher the classification score value is, the more differentiation the information of the stacked optical flows has. Herein, the value of n may depend on the actual requirements.

Figure 3:
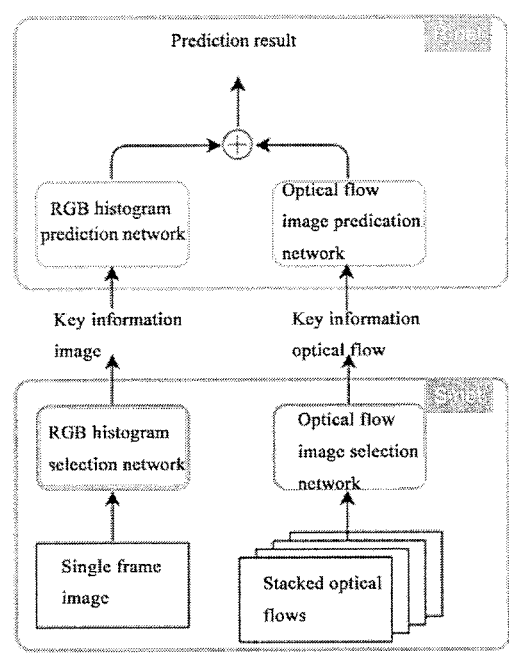
FIG. 3 shows an exemplary schematic diagram of a network structure adopted by a behavior prediction method according to an embodiment of the present disclosure.

In one embodiment, both the first neutral network (for example, RGB histogram selection network) and the second neutral network (for example, optical flow image selection network) have the same network structure and both are small neutral networks. In addition, the first neutral network and the second neutral network can form a convolutional neutral network (for example, called as S-net). The convolutional neutral network is a two-channel convolutional neutral network. One channel is input video frames which are processed via the first neutral network to obtain the key information image, and another channel is input stacked optical flows which are processed by the second neutral network to obtain the key information optical flow, as shown in FIG. 3.

Behavior prediction can be performed based on the key information frame selected in step S220, as described in the steps given below.

In step S230, predicting a type of the behavior action based on the key information frame.

In one embodiment, when the key information frame comprises only the key information image, a prediction result of the behavior action can be obtained by analyzing and recognizing the key information image. For example, analysis and recognition can be implemented on the key information image based on the third neutral network (for example, RGB histogram prediction network). For example, the third neutral network can implement accurate classified recognition on the key information image selected in step S220, to output the classification score vector. Each element in the classification score vector is a score value of respective types which can be classified by the third neutral network, and the type having the highest score value can be taken as a prediction result of the type of the behavior action finally obtained.

In another embodiment, when the key information frame comprises only the key information optical flow, a prediction result of the behavior action can be obtained by analyzing and recognizing the key information optical flow. For example, analysis and recognition can be implemented on the key information optical flow based on the fourth neutral network (for example, optical flow image prediction network). For example, the fourth neutral network can implement accurate classified recognition on the key information optical flow selected in step S220, to output the classification score vector. Each element in the classification score vector is a score value of respective types which can be classified by the fourth neutral network, and the type having the highest score value can be taken as a prediction result of the type of the behavior action finally obtained.

In another embodiment, when the key information frame comprises the key information image and the key information optical flow simultaneously, analysis and recognition can be performed based on the key information image, to obtain a first prediction result; and analysis and recognition can be performed based on the key information optical flow, to obtain a second prediction result; then, the first prediction result and the second prediction result are merged, to obtain a final prediction result of the type of the behavior action.

Exemplarily, merging the first prediction result and the second prediction result can comprise: performing weighted averaging on the first prediction result and the second prediction result according to a predetermined weighted ratio. Herein the weighted ratio of the first prediction result and the second prediction result can be 1:1 or 1:1.5. Their weighted ratios can be set according to the actual requirements. Based on merging of the two-channel prediction results of the time and spatial domain, accuracy of the behavior prediction can be further enhanced.

In the embodiment, the third neutral network (for example, RGB histogram prediction network) and the fourth neutral network (for example, optical flow prediction network) can have the same network structure and both are large neutral networks. In addition, the third neutral network and the fourth neutral network can form a convolutional neutral network (for example, called as R-net). The convolutional neutral network is a two-channel convolutional neutral network. One channel is the key information images which are processed via the third neutral network to obtain the first prediction result, and another channel is input the key information optical flow which are processed by the fourth neutral network to obtain the second prediction result. After the first prediction result and the second prediction result are merged, the final prediction result of the behavior action is obtained, as shown in FIG. 3.

Figure 4:
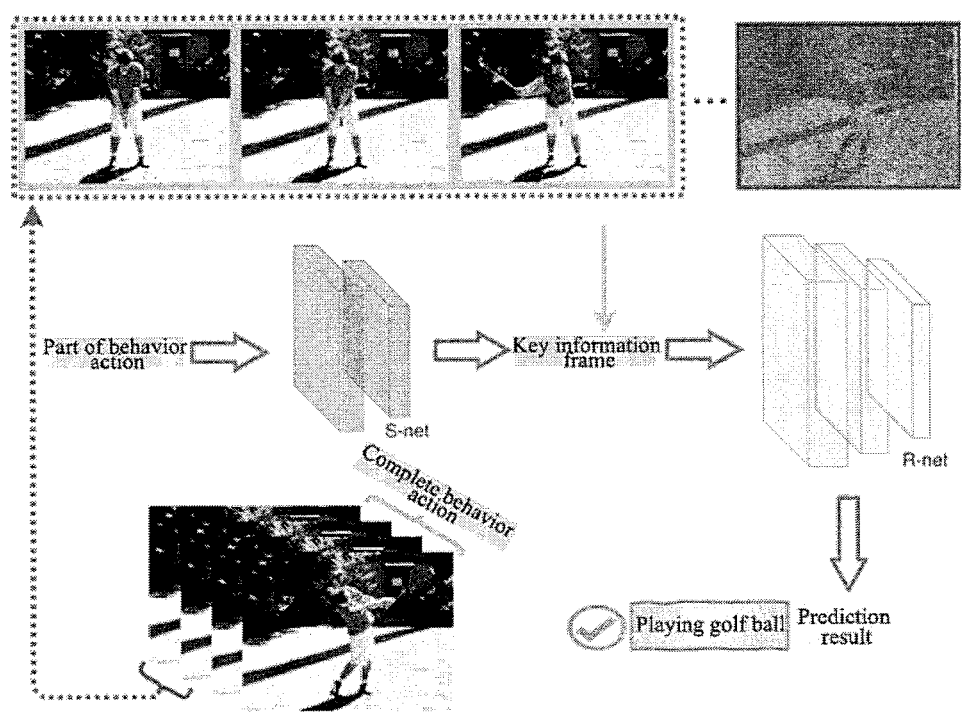
FIG. 4 shows an exemplary schematic diagram of a behavior prediction method for performing behavior prediction according to an embodiment of the present disclosure.

Now, flows of the behavior prediction method according to an embodiment of the present disclosure can be described entirely by combining with FIG. 4 and behavior prediction effects of the behavior prediction method of the embodiment of the present disclosure are realized. As shown in FIG. 4, it should be the complete action video as shown in the bottom left of FIG. 4 that realizes the complete set of behavior action of golf ball. However, based on the method of the present disclosure, the action of playing the golf ball can be predicted without obtaining all of the complete set of action video. For example, by obtaining only the first 10% of video frames, i.e., a part of video frames as shown in the upper left of FIG. 4, it only shows a part of behavior actions, key information frames can be selected through the S-net, then the key information frames are taken as an input of R-net, and after recognition by the R-net, it can be obtained that the prediction result is playing the golf ball. Obviously, this prediction result is accurate.

Based on the above description, the behavior prediction method according to the embodiment of the present disclosure can predict the type of the behavior action by extracting key information frames when only a part of video of the behavior action is observed, which greatly enhances the accuracy in prediction of the behavior action when the observed video has a low occupation in the entire behavior action.

The behavior prediction method according to the embodiment of the present disclosure is illustratively described above. The behavior prediction method according to the embodiment of the present disclosure can be realized in a device, an apparatus or a system having a memory or a processor.

In addition, the behavior prediction method according to the embodiment of the present disclosure can be disposed conveniently in a mobile device such as a smart phone, a tablet computer, a personal computer, etc. Alternatively, the behavior prediction method according to the embodiment of the present disclosure can be disposed at a server (or over a cloud) and a personal terminal.

Figure 5:
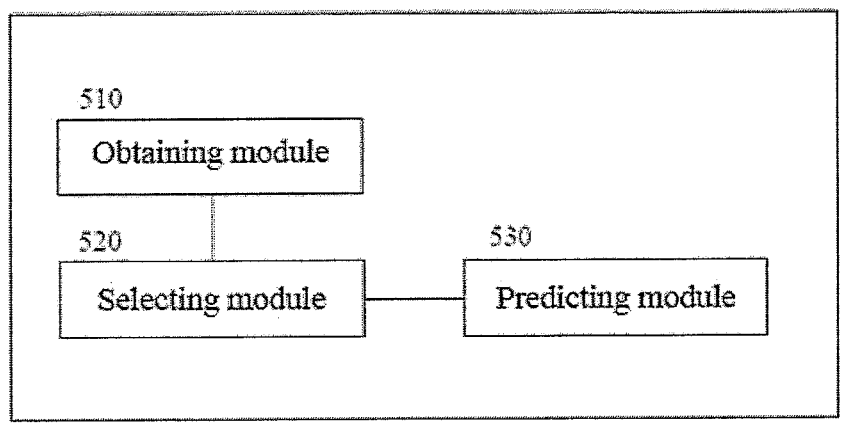
FIG. 5 shows a schematic block diagram of a behavior prediction apparatus according to an embodiment of the present disclosure.

A behavior prediction apparatus provided according to another aspect of the present disclosure will be described below by combining with FIG. 5. FIG. 5 shows a schematic diagram of a behavior prediction apparatus 500 according to an embodiment of the present disclosure.

As shown in FIG. 5, the behavior prediction apparatus 500 according to the embodiment of the present disclosure comprises an obtaining module 510, a selecting module 520 and a predicting module 530. The respective modules can perform respective steps/functions of the behavior prediction method as described in combination with FIG. 2. only major functions of respective modules of the behavior prediction apparatus 500 are described below, while the detailed content having described above are omitted.

The obtaining module 510 is configured to obtain a part of behavior action video frame sequence, which reflects only a part of the behavior action but does not reflect all of the behavior action. The selecting module 520 is configured to select a key information frame from the part of behavior action video frame sequence, wherein the key information frame has significant differentiation in the part of behavior action video frame sequence. The predicting module 530 is configure to predict a type of the behavior action based on the key information frame. The obtaining module 510, the selecting module 520 and the predicting module 530 can be realized in a way that the processor 103 in the electronic device as shown in FIG. 1 runs the program instruction stored in the storage device 104.

A complete behavior action would persist for some time from the start of occurrence to the end. A traditional behavior recognition method needs to analyze all the frames within the duration of the entire action. In this way, the algorithm would have a delay, and thus it is hard to be applied in a scenario which requires stronger real-time capability. In the behavior prediction solution in the embodiment of the present disclosure, it is unnecessary to wait for the end of the entire behavior, and prediction of the behavior action can be realized when the part of behavior action video frame sequence is acquired. For example, the part of behavior action video frame sequence can be a part of video at the very beginning of the behavior action. For another example, the part of behavior action video frame sequence can be first 10%, first 15% and so on of all the frames included the entire behavior action. On the whole, the part of behavior action video frame sequence obtained by the obtaining module 510 reflects only a part of behavior actions but does not reflect all the behavior actions. In one example, the part of behavior action video frame sequence can be a video frame observed currently in real time. In another example, the part of behavior action video frame sequence can be a video frame from any source.

In the embodiment of the present disclosure, the key information frame selected by the selecting module 520 from the video frames obtained by the obtaining module 510 is the information frame being capable of representing this segment of video, and it has significant differentiation in the obtained video frames compared with other frames, so that the prediction module 530 is capable of implementing recognition and prediction of the behavior action in this segment of video based on the key information frame. In one example, the key information frame selected by the selecting module 520 can comprise a key information image, i.e., key information of a spatial domain. The information of the spatial domain can reflect appearance characteristics, focused target and scenario of the behavior. In another example, the key information frame selected by the selecting module 520 can comprise a key information optical flow, i.e., key information of a time domain. The information of the time domain can reflect behavior motion characteristics, to capture differences of motion. In another example, the key information frame selected by the selecting module 520 can comprise both the key information image and the key information optical flow, i.e., selecting the key information of the time and spatial domain simultaneously, so that the subsequent of behavior prediction of the predicting module 530 would become more accurate.

In one embodiment, selecting of the key information image by the selecting module 520 can comprise: calculating a classification score value of each frame in the part of behavior action video frame sequence, the classification score value being a value of a type having a highest score value in a classification score vector of the each frame or being a variance between score values of respective types in the classification score vector of the each frame; and sorting an order of the part of behavior action video frame sequence according to the classification score value from high to low, and taking first m frame images obtained by sorting an order as the key information image, where m is a natural number.

Exemplarily, selecting of the key information image by the selecting module 520 can be implemented based on a first neural network (for example, RGB histogram selection network). For example, the first neutral network can implement simple classified recognition on each frame of the video frames obtained by the obtaining module 510, to output the classification score vector. Each element in the classification score vector is a score value of respective types which can be classified by the first neutral network. A type with a higher score value is likely to be a type of the behavior action in the frame. Herein, the type can comprise a type of the behavior action to be predicted.

In one example, for each frame, the selecting module 520 can take a value of a type having a highest score in the classification score vector output by the first neural network can be taken as a classification score value of the frame, then an order of video frames obtained by the obtaining module 510 is sorted in an order of the classification score values from high to low, and the first m frame images are taken as the key information image. In another example, for each frame, the selecting module 520 can take the variance between score values of respective types in the classification score vector output by the first neural network can be taken as the classification score value of the frame. Then, the order of the video frames obtained by the obtaining module 510 are sorted in an order of the classification score values from high to low, and the first m frame images are taken as the key information images. In those two examples, the higher the classification score value is, the more differentiation the information representing this frame has. Herein, the value of m can be determined depending on the actual requirements. Exemplarily, the value of m can be 10% of the total number of video frames obtained by the obtaining module 510.

In one embodiment, selecting of the key information optical flow by the selecting module 520 comprises: calculating optical flows between all of consecutive two frames in the part of behavior action video frame sequence to form a plurality of stacked optical flows; calculating a classification score value of each stacked optical flow in the plurality of stacked optical flows, the classification score value being a value of a type having a highest score value in a classification score vector of each stacked optical flow or being a variance between score values of respective types in the classification score vector of each stacked optical flow; and sorting an order of the plurality of stacked optical flows according to the classification score value from high to low, and taking first n stacked optical flows obtained by sorting an order as the key information optical flow, where n is a natural number.

Exemplarily, selecting of the key information optical flow by the selecting module 520 can be implemented based on a second neutral network (optical flow image selection network). For example, optical flow between per consecutive two frames of the video frames obtained by the obtaining module 510 can be calculated firstly. Herein, optical flow can represent a playground between two consecutive frames, which can be decomposed into horizontal (x) and vertical (y) directions. The numerical values in the two directions can be reserved as two gray scales respectively, which can be taken as two channels of a picture, that is, optical flow between per consecutive two frames can be decomposed into horizontal and vertical directions as a optical flow image of two channels. Optical flow images of several consecutive frames are stacked together in a channel augmented manner as one stacked optical flows. For example, optical flow images of consecutive p frames are stacked together to form a stacked optical flow image of a 2p channel as one stacked optical flow. Optical flow images of a plurality of consecutive p frames are stacked together to form a plurality of stacked optical flows, where p is a natural number, for example, p may be equal to 0. A plurality of stacked optical flows can be constituted as an input of the second neutral network. Simple classified recognition is implemented on each stacked optical flow by the second neutral network, to output the classification score vector, and each element in the classification score vector is a score value of respective types which can be classified by the second neutral network. The type having a higher score value is likely to be a type of a behavior action in the stacked optical flow. Herein, the type can comprise the type of the behavior action to be predicted.

In one example, for each stated optical flow, the selecting module 520 can take a value of a type having the highest score value in the classification score vector output by the second neutral network as the classification score value of the stacked optical flow, then an order of the plurality of stacked optical flows are sorted in an order of the classification score value from high to low, and the first n stacked optical flows are taken as the key information optical flow. In another example, for each stacked optical flow, the selecting module 520 can take a variance between score values of respective types in the classification score vector output by the second neutral network output as the classification score value of the stacked optical flows, then an order of the plurality of stacked optical flows can be sorted in an order of the classification score value from high to low, and the first n stacked optical flows are taken as the key information optical flow. In these two example, the higher the classification score value is, the more differentiation the information of the stacked optical flows has. Herein, the value of n may depend on the actual requirements.

In one embodiment, both the first neutral network (for example, RGB histogram selection network) and the second neutral network (for example, optical flow image selection network) have the same network structure and both are small neutral networks. In addition, the first neutral network and the second neutral network can form a convolutional neutral network (for example, called as S-net). The convolutional neutral network is a two-channel convolutional neutral network. One channel is input video frames which are processed via the first neutral network to obtain the key information image, and another channel is input stacked optical flows which are processed by the second neutral network to obtain the key information optical flow, as shown in FIG. 3.

In one embodiment, when the key information frame comprises only the key information image, the predicting module 530 can obtain a prediction result of the behavior action by analyzing and recognizing the key information image. For example, the predicting module 530 can implement analysis and recognition on the key information image based on the third neutral network (for example, RGB histogram prediction network). For example, the third neutral network can implement accurate classified recognition on the key information image selected by the selecting module 520, to output the classification score vector. Each element in the classification score vector is a score value of respective types which can be classified by the third neutral network, and the type having the highest score value can be taken as a prediction result of the type of the behavior action finally obtained.

In another embodiment, when the key information frame comprises only the key information optical flow, the predicting module 530 can obtain a prediction result of the behavior action by analyzing and recognizing the key information optical flow. For example, the predicting module 530 can implement analysis and recognition on the key information optical flow based on the fourth neutral network (for example, optical flow image prediction network). For example, the fourth neutral network can implement accurate classified recognition on the key information optical flow selected by the selecting module, to output the classification score vector. Each element in the classification score vector is a score value of respective types which can be classified by the fourth neutral network, and the type having the highest score value can be taken as a prediction result of the type of the behavior action finally obtained.

In another embodiment, when the key information frame comprises the key information image and the key information optical flow simultaneously, the predicting module 530 can perform analysis and recognition based on the key information image, to obtain a first prediction result; and perform analysis and recognition based on the key information optical flow, to obtain a second prediction result; and then merge the first prediction result and the second prediction result, to obtain a final prediction result of the type of the behavior action.

Exemplarily, merging the first prediction result and the second prediction result by the predicting module 530 can comprise: performing weighted averaging on the first prediction result and the second prediction result according to a predetermined weighted ratio. Herein the weighted ratio of the first prediction result and the second prediction result can be 1:1 or 1:1.5. Their weighted ratios can be set according to the actual requirements. Based on merging of the two-channel prediction results of the time and spatial domain, accuracy of the behavior prediction can be further enhanced.

In the embodiment, the third neutral network (for example, RGB histogram prediction network) and the fourth neutral network (for example, optical flow prediction network) can have the same network structure and both are large neutral networks. In addition, the third neutral network and the fourth neutral network can form a convolutional neutral network (for example, called as R-net). The convolutional neutral network is a two-channel convolutional neutral network. One channel is the key information images which are processed via the third neutral network to obtain the first prediction result, and another channel is input the key information optical flow which are processed by the fourth neutral network to obtain the second prediction result. After the first prediction result and the second prediction result are merged, the final prediction result of the behavior action is obtained, as shown in FIG. 3.

Based on the above description, the behavior prediction method according to the embodiment of the present disclosure can predict the type of the behavior action by extracting key information frames when only a part of video of the behavior action is observed, which greatly enhances the accuracy in prediction of the behavior action when the observed video has a low occupation in the entire behavior action.

Figure 6:
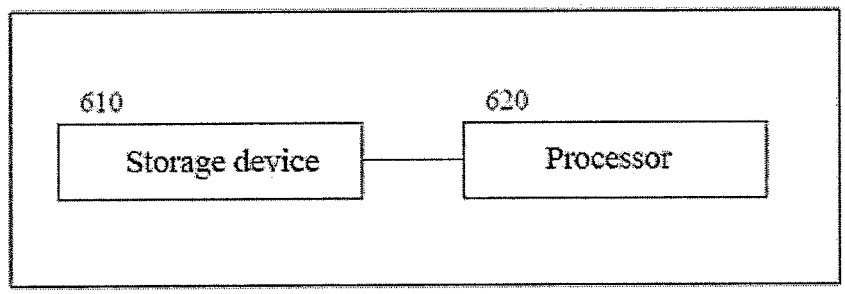
FIG. 6 shows a schematic block diagram of a behavior prediction system according to an embodiment of the present disclosure.

FIG. 6 shows a schematic block diagram of a behavior prediction system 600 according to an embodiment of the present disclosure. The behavior prediction system 600 comprises a storage device 610 and a processor 620.

Herein, the storage device 610 is used to store program codes of corresponding steps in the behavior prediction method according to an embodiment of the present disclosure. The processor 620 is used to run the program codes stored in the storage device, to execute corresponding steps of the behavior prediction method according to an embodiment of the present disclosure, and is used to realize corresponding modules in the behavior prediction apparatus according to an embodiment of the present disclosure. Additionally, the behavior prediction system 600 can further comprise an image acquisition device (not shown in FIG. 6), which can be configured to acquire behavior action video frames. Of course, the image acquisition device is not necessary, and can directly receive input of the behavior action frame video frame from other sources.

In one embodiment, when the program codes are ran by the processor 620, the behavior prediction system 600 performs following steps: obtaining a part of behavior action video frame sequence, which only reflects a part of behavior actions but does not reflect all of the behavior actions; selecting a key information frame from the part of behavior action video frame sequence, wherein the key information frame has a significant differentiation in the part of behavior action video frame sequence; and predicting a type of the behavior action based on the key information frame.

In one embodiment, the key information frame comprises a key information image and/or a key information optical flow.

In one embodiment, when the program codes are ran by the processor 620, selecting of the key information image executed by the behavior prediction system 600 comprises: calculating a classification score value of each frame in the part of behavior action video frame sequence, the classification score value being a value of a type having a highest score value in a classification score vector of the each frame or being a variance between score values of respective types in the classification score vector of the each frame; and sorting an order of the part of behavior action video frame sequence according to the classification score value from high to low, and taking first m frame images obtained by sorting an order as the key information image, where m is a natural number.

In one embodiment, when the program codes are ran by the processor 620, selecting of the key information optical flow performed by the behavior prediction system 600 comprises: calculating optical flows between all of consecutive two frames in the part of behavior action video frame sequence to form a plurality of stacked optical flows; calculating a classification score value of each stacked optical flow in the plurality of stacked optical flows, the classification score value being a value of a type having a highest score value in a classification score vector of each stacked optical flow or being a variance between score values of respective types in the classification score vector of each stacked optical flow; and sorting an order of the plurality of stacked optical flows according to the classification score value from high to low, and taking first n stacked optical flows obtained by sorting an order as the key information optical flow, where n is a natural number.

In one embodiment, the classification includes a classification of a behavior action to be predicted.

In one embodiment, forming a plurality of stacked optical flows comprises: decomposing optical flows between all consecutive two frames in the part of behavior action video frame sequence into horizontal and vertical directions as a optical flow image of two channels; and stacking optical flows of random consecutive p frames together to constitute a stacked optical flow image of 2p channels as one stacked optical flow, optical flow images of a plurality of consecutive p frames being stacked together to form the plurality of stacked optical flows, where p is a natural number.

In one embodiment, when the program codes are ran by the processor 620, selecting of the key information image executed by the behavior prediction system 600 is implemented based on a first neural network; when the program codes are ran by the processor 620, selecting of the key information optical flow executed by the behavior prediction system 600 is implemented based on a second neural network, and the first neural network and the second neural networks have a same network structure and both are small neural networks.

In one embodiment, when the program codes are ran by the processor 620, predicting a type of the behavior action based on the key information frame executed by the behavior action system 600 comprises: performing analysis and recognition based on the key information image, to obtain a first prediction result; performing analysis and recognition based on the key information optical flow, to obtain a second prediction result; and merging the first prediction result and the second prediction result, to obtain a final prediction result of the type of the behavior action.

In one embodiment, when the program codes are ran by the processor 620, the merging the first prediction result and the second prediction result executed by the behavior prediction system 600 comprises: performing weighted averaging on the first prediction result and the second prediction result according to a predetermined weighted ratio.

In one embodiment, the predetermined weighted ratio is 1:1 or 1:1.5.

In one embodiment, when the program codes are ran by the processor 620, the performing analysis and recognition based on the key information image executed by the behavior prediction system 600 is implemented by a third neural network; when the program codes are ran by the processor 620, the performing analysis and recognition based on the key information optical flow executed by the behavior prediction system 600 is implemented by a fourth neural network, and the third neural network and the fourth neural networks have a same network structure and both are large neural networks.

Figure 7:
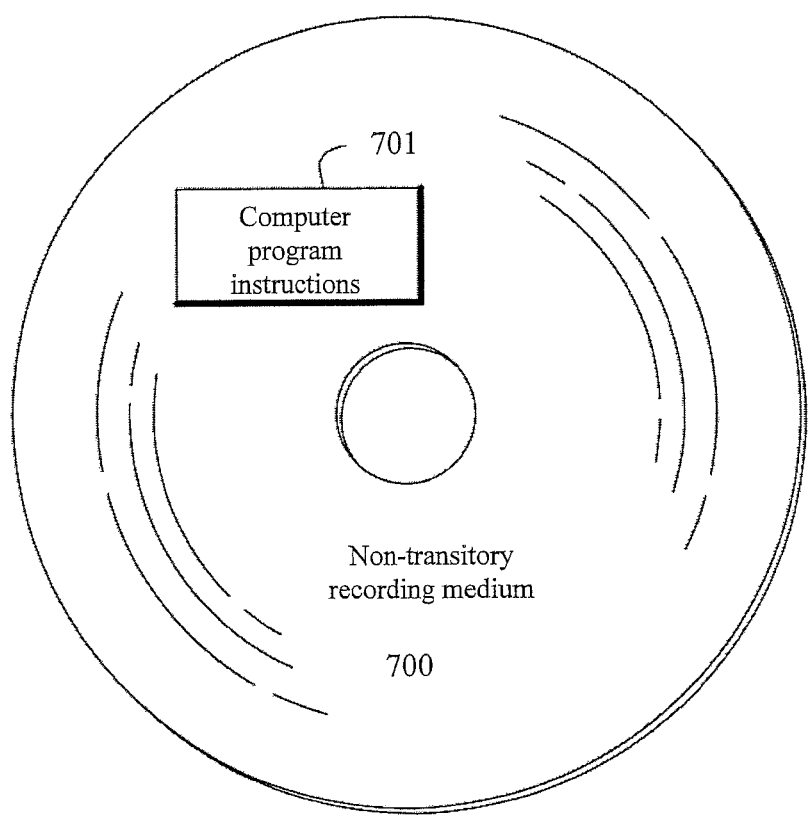
FIG. 7 shows a schematic diagram of a non-transitory recording medium according to an embodiment of the present disclosure.

FIG. 7 shows a schematic diagram of a non-transitory recording medium according to an embodiment of the present disclosure. As shown in FIG. 7, the non-transitory recording medium 700 according to an embodiment of the present disclosure stores computer program instructions 701, steps of the behavior prediction method illustrated in the above are carried out when the computer program instructions 701 are executed by a computer.

The non-transitory recording medium can comprise for example a memory card of a smart phone, a storage means of a tablet computer, a hardware of a personal computer, a read-only-memory (ROM), an erasable programmable read-only-memory (EPROM), a portable compact disk read-only-memory (CD-ROM), a USB memory, or any combination of the storage medium. The computer readable storage medium can be any random combination of one or more computer readable storage medium.

In one embodiment, when being executed by a computer, the computer program instructions can realize respective functional modules of the behavior prediction apparatus according to a embodiment of the present disclosure, and/or can perform the behavior prediction method according to an embodiment of the present disclosure.

In one embodiment, when the computer program instructions are executed by a computer or a processor, the computer or the processor can perform following steps: obtaining a part of behavior action video frame sequence, which only reflects a part of behavior actions but does not reflect all of the behavior actions; selecting a key information frame from the part of behavior action video frame sequence, wherein the key information frame has a significant differentiation in the part of behavior action video frame sequence; and predicting a type of the behavior action based on the key information frame.

In one embodiment, the key information frame comprises a key information image and/or a key information optical flow.

In one embodiment, when the computer program instructions are executed by a computer or a processor, selecting of the key information image performed by the computer or the processor comprises: calculating a classification score value of each frame in the part of behavior action video frame sequence, the classification score value being a value of a type having a highest score value in a classification score vector of the each frame or being a variance between score values of respective types in the classification score vector of the each frame; and sorting an order of the part of behavior action video frame sequence according to the classification score value from high to low, and taking first m frame images obtained by sorting an order as the key information image, where m is a natural number.

In one embodiment, when the computer program instructions are executed by a computer or a processor, selecting of the key information optical flow performed by the computer or the processor comprises: calculating optical flows between all of consecutive two frames in the part of behavior action video frame sequence to form a plurality of stacked optical flows; calculating a classification score value of each stacked optical flow in the plurality of stacked optical flows, the classification score value being a value of a type having a highest score value in a classification score vector of each stacked optical flow or being a variance between score values of respective types in the classification score vector of each stacked optical flow; and sorting an order of the plurality of stacked optical flows according to the classification score value from high to low, and taking first n stacked optical flows obtained by sorting an order as the key information optical flow, where n is a natural number.

In one embodiment, the classification includes a classification of a behavior action to be predicted.

In one embodiment, forming a plurality of stacked optical flows comprises: decomposing optical flows between all consecutive two frames in the part of behavior action video frame sequence into horizontal and vertical directions as a optical flow image of two channels; and stacking optical flows of random consecutive p frames together to constitute a stacked optical flow image of 2p channels as one stacked optical flow, optical flow images of a plurality of consecutive p frames being stacked together to form the plurality of stacked optical flows, where p is a natural number.

In one embodiment, when the computer program instructions are executed by a computer or a processor, selecting of the key information image executed by the computer or the processor is implemented based on a first neural network; when the computer program instructions are executed by a computer or a processor, selecting of the key information optical flow performed by the computer or the processor is implemented based on a second neural network, and the first neural network and the second neural networks have a same network structure and both are small neural networks having.

In one embodiment, when the computer program instructions are executed by a computer or a processor, predicting a type of the behavior action based on the key information frame executed by the computer or the processor comprises: performing analysis and recognition based on the key information image, to obtain a first prediction result; performing analysis and recognition based on the key information optical flow, to obtain a second prediction result; and merging the first prediction result and the second prediction result, to obtain a final prediction result of the type of the behavior action.

In one embodiment, when the computer program instructions are executed by a computer or a processor, the merging the first prediction result and the second prediction result executed by the computer or the processor comprises: performing weighted averaging on the first prediction result and the second prediction result according to a predetermined weighted ratio.

In one embodiment, the predetermined weighted ratio is 1:1 or 1:1.5.

In one embodiment, when the computer program instructions are executed by a computer or a processor, the performing analysis and recognition based on the key information image executed by the computer or the processor is implemented by a third neural network, the performing analysis and recognition based on the key information optical flow is implemented by a fourth neural network, and the third neural network and the fourth neural networks are large neural networks having a same network structure.

Respective modules in the behavior prediction apparatus according to an embodiment of the present disclosure can be realized in a way that the processor f the electronic device of the behavior prediction according to the embodiment of the present disclosure runs the computer program instructions stored in the memory, or can be realized when the computer instructions stored in the computer readable storage medium of the computer program product according to the embodiment of the present disclosure.

The behavior prediction method, apparatus, system and storage medium according to the embodiments of the present disclosure can predict the type of the behavior action by extracting the key information frame when only t of videos of the behavior actions is observed, which greatly enhances the accuracy of prediction of the behavior action when the observed video has a very low occupation in the entire behavior action.

Although exemplary embodiments have been described by referring to the accompany figures, it shall be understood that the above exemplary embodiments are just for illustration, but do not intend to limit the scope of the present disclosure thereto. Those ordinary skilled in the art can make various modifications and amendments, without departing from the scope and spirit of the present disclosure. All these modification and amendments intend to be included within the scope of the disclosure as claimed in the Claims.

Those ordinary skilled in the art can realize that by combining with the units and algorithm steps of respective examples described in the embodiments of the present disclosure, it is capable of being implemented by a combination of an electronic hardware, or a computer software and an electronic hardware. Whether these functions are implemented in a hardware manner or in a software manner depends on specific application and design constraints of the technical solutions. Those professional skilled in the art can use different methods for each specific application to implement the functions described above, but such implementation shall not be regarded as going beyond the scope of the present disclosure.

In the several embodiments provided by the present disclosure, it shall be understood that the disclosed device and method can be realized by other means. For example, the device embodiments described above are just for illustration; for example, division of the user is just a logical function division, and there may be additional manners of division in the actual implementation, for example, a plurality of units or components can be combined or can be integrated into another device, or some features can be omitted, or not performed.

In the description provided herein, a large amount of specific details are described. However, it shall be understood that the embodiments of the present disclosure can be realized without these specific details. In some embodiments, commonly known methods, structures and techniques are not presented in detail, for the purpose of not blurring the understanding of the present description.

Likewise, it shall be understood that in order to simplify the present disclosure and help to understand one or more of respective aspects, in the description of exemplary embodiments of the present disclosure, respective features of the present disclosure are grouped together into a single embodiment, figure or description of the single embodiment and the figure at some times. However, the method of the present disclosure shall not be explained to reflect the following intension: the present disclosure sought for protection shall claim more features than the features recited explicitly in each claim. Rather, as reflected in the corresponding Claims, its inventive point lies in that the corresponding technical problem can be solved by using features less than all the features of a certain single embodiment in the present disclosure. Therefore, the claims keeping to a specific implementation are thus incorporated explicitly into the specific implementation, wherein each claim per se is taken as a single embodiment of the present disclosure.

Those skilled in the art can understand that except mutual exclusiveness among the features, any combination can be adopted to combine all features disclosed in the present description (including the accompanying claims, abstract and figures) or all processors or units of any method or device disclosed in such way. Unless otherwise stated explicitly, each feature disclosed in the present description (including the accompanying claims, abstract and figures) can be replaced with an alternative feature that provides same, equivalent or similar purpose.

In addition, those skilled in the art are able to understand that although some embodiments described herein comprise some features but not other features included in other embodiments, but combination of features of different embodiments means to fall into the scope of the present disclosure but form different embodiments. For example, in the Claims, any one of embodiments sought for protection can be used in a manner of any combination.

Respective component embodiments of the present disclosure can be realized by a hardware, or can be realized by a software module ran on one or more processors, or can be realized by a combination of the above. Those skilled in the art shall understand that some or all functions of some modules of the embodiments of the present disclosure can be realized in practice by using a microprocessor or a digital signal processor (DSP). The present disclosure can be further realized as a part or all of apparatus programs (for example, computer program and computer program product) used for performing the method herein. Such program for realizing the present disclosure can be stored on a computer readable medium, or can have a form of one or more signals. Such signal can be downloaded from Internet website, or provided on a carrier signal, or provided in any other forms.

It shall be noted that the above embodiments are used to describe the present disclosure but not limit the present disclosure, and those skilled in the art can design alternative embodiments without departing from the scope of the Claims attached herein. In the claims, any reference marks inside the parentheses shall not form a limitation to the claims. The word "include" and "comprise" does not exclude that there are elements or steps not listed in the claims. The word "a" or "one" before an element does not exclude that there are a plurality of these elements. The present disclosure can be realized by means of a hardware including several different elements and by means of appropriate programmable computer. In the unit claims having recited several devices, several of these devices can be specifically reflected by a same hardware. The user of first, second and second do not indicate any sequence. These words can be explained as names.

The above descriptions are just specific implementations of the present disclosure or are just specification for the specific implementations of the present disclosure. The protection scope of the present disclosure is not limited thereto. Any alternation or replacement that can be conceived by those skilled in the art who are familiar with the technical field within the technical scope of the present disclosure shall fall into the protection scope of the present disclosure. The protection scope of the present disclosure shall be subject to the protection scope of the claims.

What is claimed is:

1. A behavior prediction method, comprising:
   obtaining a part of behavior action video frame sequence, which reflects a part of behavior actions;
   selecting a key information frame from the part of behavior action video frame sequence, wherein the key information frame has a significant differentiation in the part of behavior action video frame sequence relative to other frames,
   wherein the key information frame comprises a key information image and a key information optical flow; and
   predicting a type of the behavior action based on the key information frame,
   wherein selecting of the key information optical flow comprises:
      calculating optical flows between all of consecutive frames in the part of behavior action video frame sequence to form a plurality of stacked optical flows,
      calculating a classification score value of each stacked optical flow in the plurality of stacked optical flows, the classification score value being a value of a type having a highest score value in a classification score vector of each stacked optical flow or being a variance between score values of respective types in the classification score vector of each stacked optical flow, and
      sorting an order of the plurality of stacked optical flows according to the classification score value from high to low, the key information optical flow being the first n stacked optical flows obtained by the sorting, wherein n is a natural number;
   wherein forming the plurality of stacked optical flows comprises:
      decomposing optical flows between all consecutive frames in the part of behavior action video frame sequence into horizontal and vertical directions as an optical flow image of two channels, and
      stacking optical flows of random consecutive p frames in the part of behavior action video frame sequence together to constitute a stacked optical flow image of 2p channels as one stacked optical flow, optical flow images of a plurality of consecutive p frames being stacked together to form the plurality of stacked optical flows, wherein p is a natural number.

2. The behavior prediction method according to claim 1, wherein selecting of the key information image comprises:
   calculating a classification score value of each frame in the part of behavior action video frame sequence, the classification score value being a value of a type having a highest score value in a classification score vector of the each frame or being a variance between score values of respective types in the classification score vector of the each frame; and
   sorting an order of the part of behavior action video frame sequence according to the classification score value from high to low, and taking first m frame images obtained by sorting an order as the key information image, where m is a natural number.

3. The behavior prediction method according to claim 2, wherein the type includes a type of a behavior action to be predicted.

4. The behavior prediction method according to claim 2, wherein selecting of the key information image is implemented based on a first neural network, selecting of the key information optical flow is implemented based on a second neural network, and the first neural network and the second neural networks have a same network structure and both are small neural networks.

5. The behavior prediction method according to claim 1, wherein predicting a type of the behavior action based on the key information frame comprises:
performing analysis and recognition based on the key information image, to obtain a first prediction result;
performing analysis and recognition based on the key information optical flow, to obtain a second prediction result; and
merging the first prediction result and the second prediction result, to obtain a final prediction result of the type of the behavior action.

6. The behavior prediction method according to claim 5, wherein the merging the first prediction result and the second prediction result comprises:
performing weighted averaging on the first prediction result and the second prediction result according to a predetermined weighted ratio.

7. The behavior prediction method according to claim 6, wherein the predetermined weighted ratio is 1:1 or 1:1.5.

8. The behavior prediction method according to claim 4, wherein the performing analysis and recognition based on the key information image is implemented by a third neural network, the performing analysis and recognition based on the key information optical flow is implemented by a fourth neural network, and the third neural network and the fourth neural networks have a same network structure and both are large neural networks.

9. A behavior prediction system, wherein the behavior prediction system comprises a storage device and a processor, a computer program ran by the processer is stored on the storage device, and the computer program performs a behavior prediction method when being ran by the processor, comprising:
obtaining a part of behavior action video frame sequence, which reflects a part of behavior actions;
selecting a key information frame from the part of behavior action video frame sequence, wherein the key information frame has a significant differentiation in the part of behavior action video frame sequence relative to other frames,
wherein the key information frame comprises a key information image and a key information optical flow; and
predicting a type of the behavior action based on the key information frame,
wherein selecting of the key information optical flow comprises:
calculating optical flows between all of consecutive frames in the part of behavior action video frame sequence to form a plurality of stacked optical flows,
calculating a classification score value of each stacked optical flow in the plurality of stacked optical flows, the classification score value being a value of a type having a highest score value in a classification score vector of each stacked optical flow or being a variance between score values of respective types in the classification score vector of each stacked optical flow, and
sorting an order of the plurality of stacked optical flows according to the classification score value from high to low, the key information optical flow being the first n stacked optical flows obtained by the sorting, wherein n is a natural number;
wherein forming the plurality of stacked optical flows comprises:
decomposing optical flows between all consecutive frames in the part of behavior action video frame sequence into horizontal and vertical directions as an optical flow image of two channels, and
stacking optical flows of random consecutive p frames in the part of behavior action video frame sequence together to constitute a stacked optical flow image of 2p channels as one stacked optical flow, optical flow images of a plurality of consecutive p frames being stacked together to form the plurality of stacked optical flows, wherein p is a natural number.

10. The behavior prediction system according to claim 9, wherein selecting of the key information image comprises:
calculating a classification score value of each frame in the part of behavior action video frame sequence, the classification score value being a value of a type having a highest score value in a classification score vector of the each frame or being a variance between score values of respective types in the classification score vector of the each frame; and
sorting an order of the part of behavior action video frame sequence according to the classification score value from high to low, and taking first m frame images obtained by sorting an order as the key information image, where m is a natural number.

11. A non-transitory recording medium, wherein computer program instructions are stored in the non-transitory recording medium, a behavior prediction method is performed when the computer program instructions being ran by the processor, the behavior prediction method comprising:
obtaining a part of behavior action video frame sequence, which reflects a part of behavior actions;
selecting a key information frame from the part of behavior action video frame sequence, wherein the key information frame has a significant differentiation in the part of behavior action video frame sequence relative to other frames,
wherein the key information frame comprises a key information image and a key information optical flow; and
predicting a type of the behavior action based on the key information frame,
wherein selecting of the key information optical flow comprises:
calculating optical flows between all of consecutive frames in the part of behavior action video frame sequence to form a plurality of stacked optical flows,
calculating a classification score value of each stacked optical flow in the plurality of stacked optical flows, the classification score value being a value of a type having a highest score value in a classification score vector of each stacked optical flow or being a variance between score values of respective types in the classification score vector of each stacked optical flow, and
sorting an order of the plurality of stacked optical flows according to the classification score value from high to low, the key information optical flow being the first n stacked optical flows obtained by the sorting, wherein n is a natural number;

wherein forming the plurality of stacked optical flows comprises:
  decomposing optical flows between all consecutive frames in the part of behavior action video frame sequence into horizontal and vertical directions as an optical flow image of two channels, and
  stacking optical flows of random consecutive p frames in the part of behavior action video frame sequence together to constitute a stacked optical flow image of 2p channels as one stacked optical flow, optical flow images of a plurality of consecutive p frames being stacked together to form the plurality of stacked optical flows, wherein p is a natural number.

12. The non-transitory recording medium according to claim 11, wherein selecting of the key information image comprises:
  calculating a classification score value of each frame in the part of behavior action video frame sequence, the classification score value being a value of a type having a highest score value in a classification score vector of the each frame or being a variance between score values of respective types in the classification score vector of the each frame; and
  sorting an order of the part of behavior action video frame sequence according to the classification score value from high to low, and taking first m frame images obtained by sorting an order as the key information image, where m is a natural number.

* * * * *